July 9, 1957    A. P. MANSOFF    2,798,894
PLATE AND INSULATOR FOR STORAGE BATTERY
Filed March 30, 1956
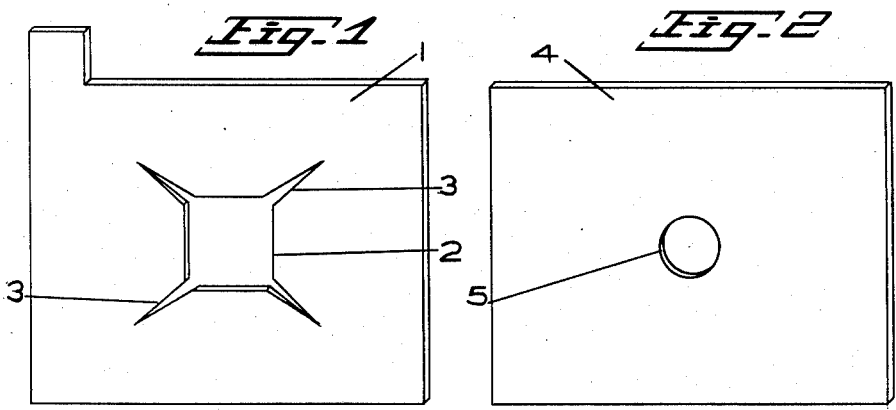
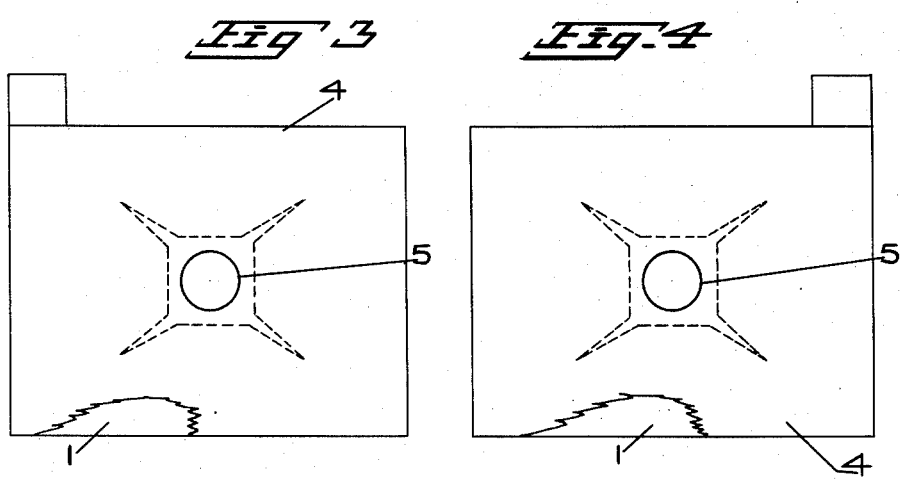

United States Patent Office 2,798,894
Patented July 9, 1957

2,798,894
PLATE AND INSULATOR FOR STORAGE BATTERY

Arthur Percival Mansoff, Dauphin, Manitoba, Canada

Application March 30, 1956, Serial No. 575,229

1 Claim. (Cl. 136—6)

My invention relates to storage batteries, having reference to an improvement in plates and insulators for batteries of a character employing an electrolyte or fluid.

The object of the invention is to provide an improved storage battery of a type using a series of alternate plates and insulators, to provide a faster acting cell that is less liable to overheat and will not run dry of fluid as quickly as the present type of battery.

Having regard to the above and other objects as will become apparent by reference to the accompanying specification taken in conjunction with the drawings my invention resides in the construction of battery plates and insulators as herein disclosed.

In the drawings:

Fig. 1 is a side view of a battery plate shown with my improved fluid opening.

Fig. 2 shows a similar view of an insulator for use with the plate.

Fig. 3 shows a side view of the insulator and plate combined.

Fig. 4 shows a view similar to that of Figure 3 but taken from the reverse side.

Having reference to the drawings there is shown a battery plate 1, which for the purpose of the present invention includes a square center opening 2 with tapered slots 3 radiating outward from the opening 2 bisected by the diagonals of the plate.

In conjunction with the plate as above described I provide an insulator 4 having a round center opening 5 axially aligning with the square center opening 2 of the battery plate 1 and considerably smaller in size.

These plates are intended as part of the series of plates and insulators forming the battery cell. They are essentially designed to feed the electrolyte in from the sides through the center and prevent overheating under charge and discharge. The insulator hole is smaller so that the shedding plate will not catch there and short as it would if the holes were the same size and shape making a flush surface for them to catch on.

The fluid comes in from the sides of the cells flowing through the round holes in the insulators and into each plate compartment. The fluid can cross flow into the plates through the insulators from the outside of the cell. It can get in and out faster making a faster acting cell. Also the reserved electrolyte or fluid will keep the whole cell from overheating and the cell will not run dry of fluid so fast.

While I have herein disclosed a preferred embodiment of my invention, changes in the shape and form of the plate openings would readily be conceivable and in so far as such changes come within the spirit and scope of the invention as defined in the appended claim they would be considered a part hereof.

Having thus particularly described and ascertained the nature of my said invention, what I claim and wish to secure by Letters Patent is:

A battery providing alternating plates and insulators and including an electrolyte, in which said plates have square center openings for passage of the electrolyte, said openings including tapered slots extending diagonally outwardly at the corners thereof, and the insulators have round openings for passage of the electrolyte axially aligned with the plate openings and considerably smaller than the plate openings.

References Cited in the file of this patent

UNITED STATES PATENTS

| | | |
|---|---|---|
| 651,089 | Strecker | June 5, 1900 |
| 1,947,473 | Huebner | Feb. 20, 1934 |

FOREIGN PATENTS

| | | |
|---|---|---|
| 249,655 | Italy | Aug. 4, 1926 |